Oct. 21, 1969 A. GOETZBERGER 3,474,285

INFORMATION STORAGE DEVICES

Filed March 27, 1968 2 Sheets-Sheet 1

INVENTOR
A. GOETZBERGER
BY
Roderick B. Anderson
ATTORNEY

INFORMATION STORAGE DEVICES

Filed March 27, 1968 2 Sheets-Sheet 2

United States Patent Office 3,474,285

Patented Oct. 21, 1969

3,474,285

INFORMATION STORAGE DEVICES

Adolf Goetzberger, Berkeley Heights, N.J., assignor to Bell Telephone Laboratories, Incorporated, Murray Hill, N.J., a corporation of New Jersey Filed Mar. 27, 1968, Ser. No. 716,571
Int. Cl. H01j *31/48*
U.S. Cl. 315—11 12 Claims

ABSTRACT OF THE DISCLOSURE

A television camera tube includes a target structure comprising a p-type semiconductor, a dielectric layer, an array of metal contacts on the dielectric layer and a matrix grid conductor resistively connected to each of the metal contacts. The grid conductor biases the metal contacts to form depletion layers in the wafer which are mutually isolated by diffused $p^+$ guard rings. The depletion layers store energy indicative of localized light input, and this energy is retrieved by scanning the metal contacts with an electron beam. Other embodiments are also described.

Background of the invention

Because of its low cost and simplicity of adjustment, the vidicon is presently the most widely used television camera tube. It includes a flat photoconductor one surface of which is periodically scanned by an electron beam, the opposite surface being coated with a transparent conductive film and being exposed to incoming light. As the beam scans the photoconductor, a signal is obtained from the conductive film, the amplitude of which is proportional to the light intensity to which successive localized areas of the photoconductor have been subjected.

Because of such disadvantages as a limited useful life expectancy and susceptibility to damage both by overexposure to light and to the electron beam, considerable effort has been made in developing alternative television camera tubes. For example, the copending application of T. M. Buck et al., Ser. No. 605,715 filed Dec. 29, 1966, assigned to Bell Telephone Laboratories, Incorporated, describes a camera tube having a target comprising an array of diodes each of which stores energy representative of localized light input. Because the target structure can be made of semiconductor materials other than those required for conventional vidicons, the tube does not suffer from many of the drawbacks of vidicons. The resolution of the device, however, depends on the density of diodes along the target structure which in turn requires rather complicated fabricating processes. Further, good device operation requires careful control of the leakage current across the diode junctions.

The copending application of D. Kahng et al., Ser. No. 614,457, filed Feb. 7, 1967, and assigned to Bell Telephone Laboratories, Incorporated, describes a camera tube target structure comprising a transparent dielectric layer sandwiched between a transparent conductive layer and an n-type semiconductor. Light impinging on the semiconductor through the transparent metal and dielectric layers ionizes deep donors in the semiconductor and thereby stores energy representative of a localized light input that can be retrieved by scanning the opposite surface of the semiconductor with an electron beam. Fabrication of this device requires control of the deep donor concentration of the semiconductor which in some cases may be difficult.

Summary of the invention

An illustrative embodiment of the present invention is a television camera tube having a target structure that may be made from any of a number of semiconductor materials thereby avoiding some of the fabrication problems of the prior art. Moreover, flexibility in choice of materials permits the design of television camera tubes which are responsive to light of specific frequencies.

A camera tube target structure which is illustrative of the invention comprises a p-type semiconductor wafer one side of which is exposed to incoming light with the other side being coated with a dielectric layer. An array of metal contacts is bonded to the dielectric layer with each metal contact defining an information storage element of the target structure. A matrix grid conductor is also included on the dielectric layer which is resistively connected to metal contacts by a thin coating overlaying the entire target surface. The matrix grid conductor is biased positively with respect to the p-type semiconductor wafer to establish a voltage between the metal contacts and the wafer and form a space charge layer in the wafer opposite each contact.

A scanning electron beam successively impinges on the metal contacts to drive them to a negative potential which causes minority carrier electrons in the space-charge layer to be injected into the bulk of the semiconductor wafer. After the beam leaves a metal contact the grid voltage begins to reestablish the space-charge layer as before, but, before the space-charge layer reaches equilibrium, the electron beam again returns to apply a negative bias to the metal contact, thereby again injecting electrons into the wafer.

Between successive impingements of the beam, the density of electrons accumulating in the space-charge layer is proportional to the localized light input; and hence, the number of electrons injected into the bulk of the wafer during each beam impingement is proportional to the integrated light intensity to which the storage element has been subjected. This in turn is manifested as a current fluctuation in an output conductor connected to the semiconductor wafer which is taken as the output signal of the device. In effect, varying electron densities in the space-charge layer of each information storage element constitutes stored information which is retrieved or "read-out" upon the impingement of the electron beam of the corresponding metal contact.

In order that the energy stored in each storage element be independent of that stored in adjacent elements, transverse electron flow at the semiconductor-dielectric interface should be inhibited. This can be done, for example, by including at the semiconductor interface guard rings of $p^+$ conductivity each of which essentially surrounds an information storage element. Since these $p^+$ conductivity regions cannot be easily depleted or inverted in conductivity, they separate the space-charge layers of adjacent storage elements thereby permitting each element to store electrons independently.

In substance, each of the information storage elements is a metal-insulator-semiconductor diode which is reverse biased by the grid conductor, with the reverse bias being periodically removed by the impinging electron beam; alternatively, the beam may have a sufficient voltage to forward bias the dioded. Likewise, the target structure is an integrated circuit which, as will be appreciated by those skilled in the art, can be easily fabricated through the use of known techniques. The problems of doping which occur in the Kahng et al. case are avoided as are problems inherent in the Buck et al. device such as junction leakage and fabrication complexities.

The camera tube embodiment is merely illustrative of one use of the information storage and retrieval capabilities of the invention. Other embodiments and modifications will be discussed later.

Drawing description

These and other objects, features and advantages of the invention will be better understood from the detailed description taken in conjunction with the accompanying drawing, in which.

Detailed description

Figure 1:
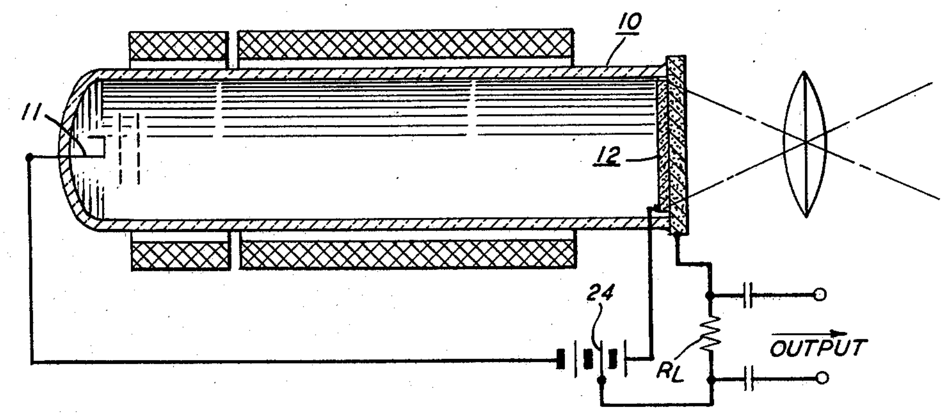
FIG. 1 is a schematic view of a television camera tube in accordance with one embodiment of the invention.

Referring now to FIG. 1, there is shown, as an illustrative embodiment of the invention, a vidicon-type television camera tube 10 having a cathode 11 for forming and projecting an electron beam toward a target structure 12. The tube includes conventional electron beam alignment, accelerating and focusing structure, and apparatus for deflecting the beam in a line and frame sequence as required for conventional raster scanning of the target structure. Light to be recorded and transmitted is imaged on the side of the target structure opposite the electron beam. The purpose of the tube, like that of conventional vidicons, is to convert incoming energy into electrical energy, store the electrical energy and release or read-out the stored energy in the form of a continuous video signal as indicated by the output arrow.

Figure 2:
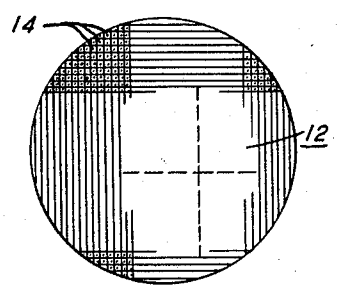
FIG. 2 is a schematic view of one side of the target structure of the television camera tube of FIG. 1.
Figure 3:
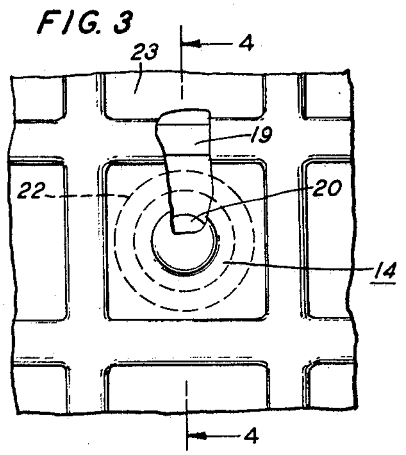
FIG. 3 is an enlarged fragmentary view of part of the target structure of FIG. 2.

The side of the target structure exposed to the electron beam, or target surface, is shown in FIG. 2. As can be seen, the target structure comprises a repetitive array of information storage elements 14 which are best discussed with reference to FIGS. 3 and 4 which show in enlarged form, not necessarily to scale, a typical information storage element 14.

Figure 4:
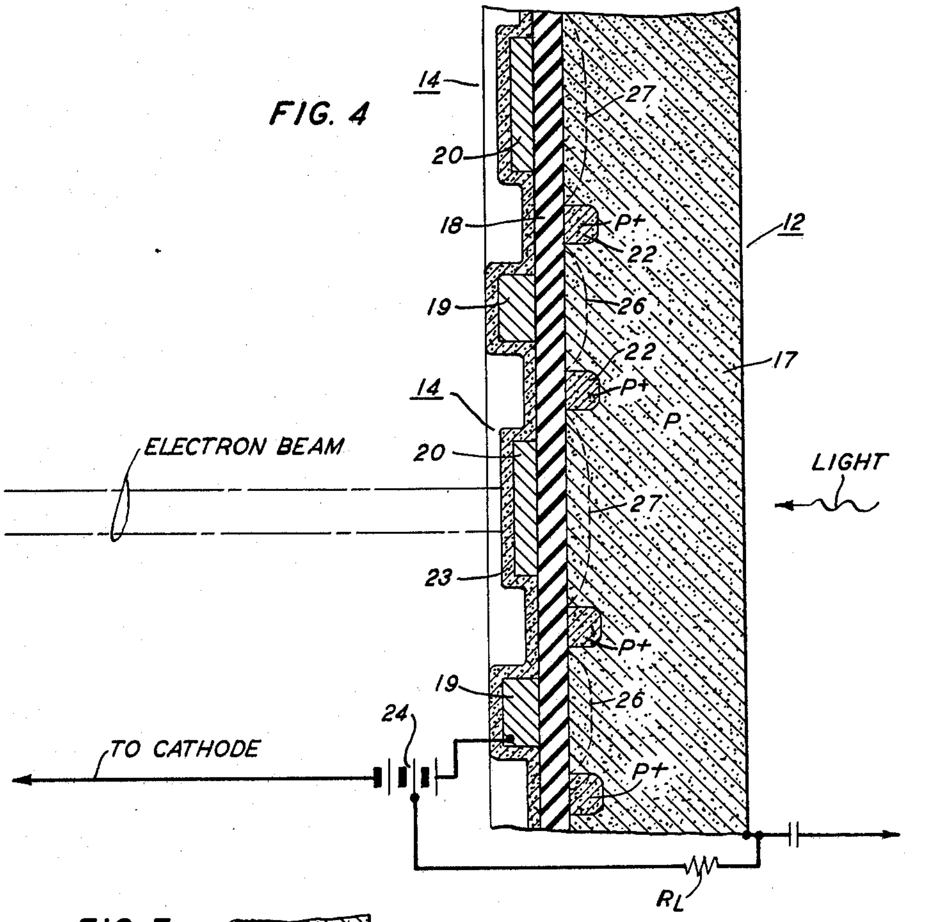
FIG. 4 is a sectional view taken along lines 4—4 of FIG. 3.

As shown in FIG. 4, the target structure 12 comprises a p-type semiconductor wafer 17 one surface of which is exposed to the incoming light, the opposite surface being coated with a thin dielectric layer 18. A matrix grid conductor 19 overlays the dielectric layer and includes within each of its segments a metal contact 20 which essentially defines the various information storage elements 14. Diffused guard rings 22 of $p^+$ conductivity are included in the wafer at its interface with the dielectric layer; each guard ring surrounds a metal contact 20 and essentially circumscribes each of the information storage elements 14. A resistive coating 23 overlays the entire target surface of the target structure and resistively interconnects the matrix grid conductor 19 with the metal contacts 20. A battery 24 biases the grid conductor 19 and the metal contacts 20 at a positive potential with respect to the semiconducor wafer.

The positive bias on the grid conductor creates inversion layers 26 in the p-type wafer opposite the conductor which do not affect device operation. The purpose of the grid conductor is to put a positive or reverse bias on the metal contacts 20 to create space-charge layers 27 in the wafer, each of which, if allowed to reach an equilibrium state, would constitute an inversion layer. As is known, an inversion layer is a region of a semiconductor in which the semiconductor conductivity has been reversed or inverted due to the application of an external force, usually an electric field. The $p^+$ guard rings 26, however, have such a high p-type conductivity that the applied voltage is insufficient to create inversion layers within them. Hence, the space-charge layers 27 of each of the information storage elements are mutually isolated.

When the electron beam impinges on one of the metal contacts it temporarily drives the metal contact voltage negative to eliminate the reverse bias electric field between the metal contact and the wafer. This temporarily dissipates the corresponding space-charge layer 27 and causes electrons that have accumulated at the semiconductor-dielectric interface to be injected into the bulk of the wafer. Electron injection causes a voltage to appear across the resistor $R_L$ connected to the wafer which is taken as the output signal.

After the electron beam leaves the metal contact 20, the corresponding space-charge layer 27 again begins to form, but, in the absence of an intense light input, does not reach equilibrium before the electron beam returns in its subsequent scan. Between successive electron beam impingements, the wafer is exposed to incoming light which, as is known, creates hole-electron pairs within the semiconductor wafer. The photo-generated minority carrier electrons are of course attracted to the space-charge layer of the corresponding storage element and, as a result, the quantity of electrons stored in each space-charge layer is a function of the localized light intensity to which that storage element has been subjected. Hence, as the electron beam scans successive metal contacts 27, varying quantities of stored electrons are injected into the wafer and a continuous signal is derived from the device which is indicative of the spatially varying light intensity imaged on the wafer.

Figure 5:
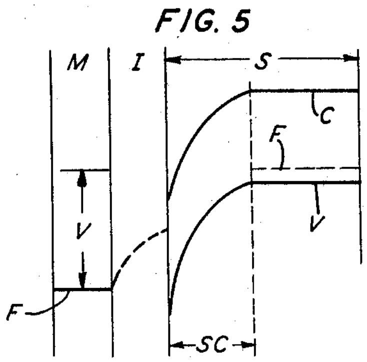
FIGS. 5 and 6 are energy band diagrams of one information storage element of the target structure of FIG. 4.
Figure 6:
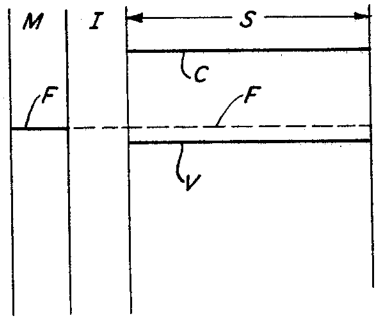

FIGS. 5 and 6 respectively show typical energy band configurations of a storage element between beam scan and during electron beam impingement. M. I, S respectively refer to the metal contact region, the insulator or dielectric region, and the semiconductor region of each information storage element. C, V and F respectively denote the lower boundary of the conduction band, the upper boundary of the valence band, and the Fermi level.

Assuming that the electron beam drives the metal contact to the same voltage as the wafer, then, during impingement, the Fermi level of the metal contact will be at the same energy level as the Fermi level in the wafer as shown in FIG. 6. The location of the Fermi level nearer the valence band than the conduction band in FIG. 6 illustrates that during impingement the semiconductor has reverted to p-type conductivity and no space-charge layer exists.

When the beam leaves the metal contacts, the positive bias voltage is reapplied causing bending of the conduction and valence bands which repels positively-charged majority carriers from the semiconductor-dielectric interface, thus giving rise to the space-charge layer SC. The band bending shown in FIG. 5 is not intended to represent a stable condition because, in the absence of very high light intensity, the space-charge layer never reaches an equilibrium state. This characteristic is assured merely by making the thermal generation time $\tau_g$ much longer than the frame time $\tau_f$ of the scanning electron beam. $\tau_g$ is the time required to form a stable inversion layer due to the thermal generation of minority carriers, in this case conduction band electrons, at the temperature of operation. With the frame time of $1/30$ second, the wafer may, for example, be silicon which has a typical thermal generation time of .1 second to one second.

Since the wafer cannot thermally generate electrons quickly enough to fill the allowed minority carrier energy levels at the surface of the space-charge layer, electrons generated by incoming light will diffuse to the space-charge layer as explained before. As the electrons reach the space-charge layer, they act as terminations for electric field lines extending from the metal layer, and the space-charge layer SC of FIG. 5 becomes narrower. The diffusion of optically generated electrons to the semiconductor-dielectric interface will continue unless and until the space-charge layer reaches equilibrium. Hence, if the thermal generation time $\tau_g$ is relatively small, the maximum light intensity to which the device is sensitive will likewise be relatively small, while if the thermal generation time is large, the device will respond to higher input light intensities.

It is clear from FIG. 6 that electron beam impingement on the metal contact causes the stored minority carrier electrons to be injected or diffused into the semiconductor bulk. While the figure indicates that the electron beam drives the metal contact to the same potential as the semiconductor, it could be used to drive the metal contact to a more negative potential than the semiconductor. It should be noted that the minority carrier storage and injection mechanisms are essentially the same as those described in the copending application of C. N. Berglund, Ser. No. 571,555, filed Aug. 10, 1966 and assigned to Bell Telephone Laboratories, Incorporated, although the use to which these mechanisms are put is entirely different from that of the Berglund device.

In order that the electron beam may temporarily drive the metal contact to a negative voltage with respect to the matrix grid conductor, it is important that the resistance of film 23 that interconnects the metal contacts and the grid conductor be sufficiently high. The dielectric layer 18 constitutes a capacitance between the metal contact and the wafer which is in series with the resistive interconnection of the contact to the grid conductor. This resistance-capacitance combination permits charge to be temporarily stored on the metal contact 20 for a time determined by the corresponding R-C time constant $\tau_{RC}$. The resistance between each metal contact and the grid conductor should be tailored with respect to the capacitance between the contact and the wafer to give a time constant $\tau_{RC}$ that is longer than the time taken for the beam to scan successive information elements, but shorter than the frame time $\tau_f$. This of course requires a specific relationship of the resistivity and thickness of coating 23, the dielectric constant and thickness of dielectric layer 18, and the pertinent voltages, which are matters within the ordinary skill of a worker in the art.

The device which has been described gives considerable flexibility in the choice of specific materials and parameters that may be used. While any of a number of semiconductors may be used, for example to give selective light frequency sensitivity, some care should be taken to choose semiconductors with a high carrier lifetime and low bulk and surface carrier generation rates. The thickness of the wafer should be smaller than one diffusion length to permit photo-generated minority carriers to diffuse to the space-charge layers. The dielectric layer 18 may be silicon dioxide with a thickness of approximately 1000 angstroms and the resistive coating 23 is preferably a relatively high resistivity semiconductor such as antimony trisulfide.

An n-type semiconductor wafer could alternatively be used, in which case the voltage on the grid conductor should be negative with respect to the wafer to create the space-charge layers; and the electron beam would be used to drive the metal contacts positively. This could be done by establishing, in a known manner, a target surface secondary emission ratio of greater than one.

The electron beam scanning should actually be considered as only one possible form of information readout. Other apparatus that has been proposed for performing the electronic equivalent of electron beam scanning could be used with the target structure; for example, piezoelectric strips for propagating elastic waves having accompanying localized electric field domains could be used for temporarily changing the voltages on the metal contacts 20 as described before. Other alternative apparatus which has been proposed comprises strips of bulk-effect semiconductor material for transmitting so-called "Gunn-effect" electric field domains.

Figure 7:
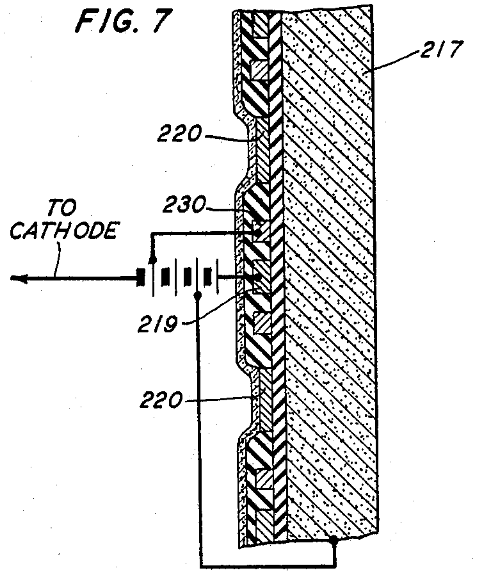
FIG. 7 is a sectional view of part of a television camera tube target structure in accordance with another embodiment of the invention.

The annular guard rings 22 of FIG. 4 should likewise only be considered as one example of a technique for isolating the space-charge layers 27. Another technique is shown in FIG. 7 wherein a conductive ring 230 which surrounds each metal contact 220 is permanently biased at a negative potential with respect to the semiconductor wafer 217. The voltage on metal ring 230 attracts majority carrier holes in the wafer, prevents an inversion layer from being formed in the wafer directly opposite the metal ring, and therefore mutually isolates the space-charge layers of the repetitive information storage elements. The metal rings 230 should of course be electrically insulated from the metal contacts 220, the matrix grid connector 219 and the resistive coating 223.

As still another alternative to the diffused guard rings, annular regions of the semiconductor wafer surface contiguous with the dielectric layer may be provided with a high surface state density. Although the precise nature of semiconductor surface states is not well understood, it is known that a high surface state density will act much as a high trap concentration; surface states can terminate electric field lines and therefore prevent conductivity inversion. As is also known, a high surface state density can be formed by bombarding the selected region of the semiconductor surface with an electron beam, with X-rays, or with gamma rays. The annular regions of high surface state density surrounding each information storage element can therefore be made by bombarding the semiconductor surface through an appropriate mask during device fabrication.

Figure 8:
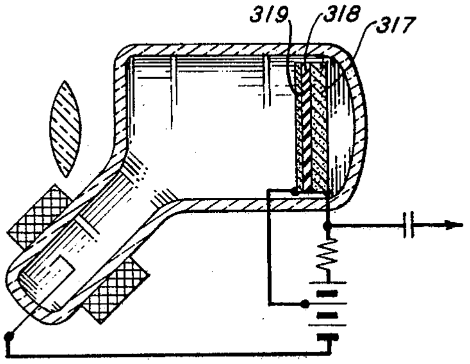
FIG. 8 is a schematic view of a television camera tube in accordance with yet another embodiment of the invention.

Since the dielectric layer 18, the matrix grid conductor 19, the metal contacts 20 and the resistive coating 23 of FIG. 4 may all be made sufficiently thin to be transparent, the light input could be imaged on the target surface of the target struuture if so desired as is shown in FIG. 8. In FIG. 8, the semiconductor wafer 317 is coated with the dielectric layer 18 upon which is overlaid the matrix grid conductor 319. With elements 319 and 318, as well as the metal contacts which are not shown, being sufficiently thin to be transparent, the light impinges directly on the semiconductor 317. The electron beam is deflected for raster scanning as in known iconoscope television camera tubes.

The specific embodiments which have been shown and described are intended to be merely illustrative of the inventive concept. Various other modifications and embodiments may be made by those skilled in the art without departing from the spirit and scope of the invention.

What is claimed is:

1. In an electronic storage device the combination comprising:

a semiconductor wafer;

a dielectric layer substantially coextensive with one side of the wafer;

a plurality of metal contacts bonded to the dielectric layer, each contact defining with the adjacent wafer an information storage element;

a grid electrode bonded to the dielectric layer and resistively connected to each of the contacts;

and means included in the wafer for inhibiting the transfer of minority carriers between adjacent information elements of the wafer.

2. The storage tube of claim 1 further comprising:

means for applying a reverse-bias voltage to the grid electrode for forming space-charge layers in the semiconductor at its interface with the dielectric layer;

means for recording information in the information elements comprising means for selectively generating minority carriers in the wafer, thereby modifying energy stored in the space-charge layers of selected information elements;

and means for retrieving stored information comprising means for selectively and temporarily applying a sufficient voltage to the metal contacts to inject minority carriers from the space-charge layers into the wafer.

3. The storage device of claim 2 wherein:

the wafer is characterized by a thermal generation time $\tau_g$ which, in the absence of information recording, is the time required for each space-charge layer to establish a stable inversion layer at the temperature of operation;

and the information retrieving means further comprises means for successively applying temporary voltages to each of the metal contacts within a time period that is shorter than $\tau_g$.

4. The storage device of claim 3 wherein:

the recording means comprises means for directing light of varying spatial intensity onto the wafer;

and the information retrieving means comprises means for scanning the metal contacts with an electron beam.

5. The storage device of claim 4 wherein:

each metal contact is periodically impinged by the electron beam, successive impingements of each contact being separated by a frame time $\tau_f$ of the electron beam;

an inherent capacitance is defined between each metal contact in the wafer which, together with the resistance between each metal contact and the grid conductor provides an inherent resistance-capacitance time constant $\tau_{RC}$ for each information element;

the time constant $\tau_{RC}$ being smaller than the frame time $\tau_f$ and larger than the time required for the beam to scan each information element.

6. The storage device of claim 5 wherein:

the current transfer inhibiting means comprises means for substantially precluding the formation of an inversion layer in a wafer along areas that substantially circumscribe each information storage element.

7. The storage element of claim 6 wherein:

the inversion layer precluding means comprises regions in the wafer along the interface of the dielectric layer which are of a significantly higher conductivity than the remainder of the wafer and of the same conductivity type as the wafer.

8. The storage device of claim 6 wherein:

the inversion layer precluding means comprises metal rings on the dielectric layer each surrounding one of the metal contacts, and the means for biasing each metal ring at a sufficient voltage to preclude the formation of an inversion layer only in an annular region of the wafer which is opposite said metal ring.

9. The storage device of claim 6 wherein:

the inversion layer precluding means comprises regions on that surface of the wafer contiguous with the dielectric layer having a much higher surface state density than the remainder of the wafer.

10. An information storage element comprising:

an extrinsic semiconductor wafer;

a dielectric layer sandwiched between the semiconductor layer and a metal contact;

means for applying a first voltage to the metal contact which is sufficient to produce a space-charge layer in the wafer;

means for producing minority carriers in the wafer which are indicative of an information input, said minority carriers being stored in the space-charge layer;

a conductor connected to the wafer for deriving an output signal therefrom;

and means for applying a second voltage to the metal contact which is sufficient to inject minority carriers from the space-charge layer into the wafer, thereby generating an output signal in the conductor which is indicative of information stored in the storage element.

11. The information storage element of claim 10 wherein:

the wafer is of p-type conductivity;

the first voltage is positive with respect to the wafer voltage;

and the second voltage is negative with respect to the first voltage.

12. The information storage element of claim 10 wherein:

the wafer is characterized by an inherent thermal generation time $\tau_g$;

the first and second voltage applying means comprises means for successively temporarily applying the second voltage to the metal contact and for maintaining the first voltage on the metal contact between successive applications of the second voltage.

References Cited

UNITED STATES PATENTS

| | | | |
|---|---|---|---|
| 2,963,604 | 12/1960 | Weimer | 313—66 |
| 3,087,985 | 4/1963 | Heijne et al. | 315—11 XR |
| 3,202,853 | 8/1965 | Weimer | 313—66 XR |
| 3,252,030 | 5/1966 | Cawein | 313—66 |
| 3,322,955 | 5/1967 | Desuignes | 313—66 XR |
| 3,403,284 | 9/1968 | Buck et al. | 250—211 XR |

RODNEY D. BENNETT, Jr., Primary Examiner

J. P. MORRIS, Assistant Examiner

U.S. Cl. X.R.

250—211; 313—66